United States Patent [19]

Günther

[11] Patent Number: 5,312,241
[45] Date of Patent: May 17, 1994

[54] HOT RUNNER NOZZLE HAVING LATERAL ELECTRODE TERMINALS

[75] Inventor: Herbert Günther, Allendorf/Eder, Fed. Rep. of Germany

[73] Assignee: Dipl.-Ing. Herbert Gunther Gesellschaft mbh, Perchtoldsorf, Austria

[21] Appl. No.: 930,896

[22] Filed: Aug. 17, 1992

[30] Foreign Application Priority Data

Aug. 16, 1991 [DE] Fed. Rep. of Germany ....... 4127036

[51] Int. Cl.$^5$ .............................................. B29C 45/20
[52] U.S. Cl. ................ 425/549; 264/328.8; 264/328.15; 425/572
[58] Field of Search ............. 425/549, 568, 572; 264/328.15, 328.8

[56] References Cited

U.S. PATENT DOCUMENTS

| | | | |
|---|---|---|---|
| 4,682,944 | 7/1987 | Muller | 425/572 |
| 4,900,560 | 2/1990 | Trakas | 425/568 |
| 4,913,912 | 4/1990 | Leverenz | 425/549 |
| 4,921,708 | 5/1990 | Gellert | 425/549 |
| 4,981,431 | 1/1991 | Schmidt | 425/549 |

Primary Examiner—Tim Heitbrink
Attorney, Agent, or Firm—Fred Philpitt

[57] ABSTRACT

A hot runner nozzle (10) with lateral electrode terminals (28) has a broad flanged body (18) that continues as a thermally graded narrower shaft (20) through which a heatable flow tube (22) extends. Into its high-strength foot portion (38), at least one nozzle tip (50, 50') is insertable; a high-strength heat-conductive envelope tube (30) having a re-entrant outer shoulder (34) adjacent the casing (12) is joined to a separating sleeve (36) of the shaft (20). The lower end of a heating tube (26) is thermoconductively connected to a metal bush (40) whose upper portion is thermally insulated by air gaps (54, 44) from both the separating sleeve (36) and the heating tube (26). A supporting ring (56) of low heat conduction is mounted between axial faces of the heat-conductive bush (40) and the separating sleeve (36). The nozzle tips (50, 50') are form-fitted or welded to the foot portion (38) at an angle between 0° and 90° relative to the axis (A) of the shaft (20). The foot portion (38) is centered in a divided mold insert (16) wedge-fitted into the casing (12).

9 Claims, 3 Drawing Sheets

HOT RUNNER NOZZLE HAVING LATERAL ELECTRODE TERMINALS

FIELD OF THE INVENTION

The invention relates to a hot runner nozzle.

Such nozzles are used for passing a flow of plastics material from an injection molding machine to an injection point in the molding tool. For this purpose, the thermoplastic mass within the flow tube system must be kept fluid until it is made to freeze in the mold. The temperature drop at the transition points requires skillful processing in order to minimize power consumption.

PRIOR ART

Hot runner nozzles have been known which have nozzle tips at their lower end portions in order to gate an article from various points or to manufacture several articles at the same time. Conventionally, two to four nozzle tips each are inserted into a hot runner foot portion in a direction either parallel or at an angle of 45° to the axis of a flow tube extending through the hot runner nozzle.

A design disclosed in DE 90 03 574 U1 features an active component, viz. a nozzle body including a flow tube, and a passive retainer having radial tips which serve to laterally hold the unit in a position that safeguards a narrow ring gap around each injection point. Practical experience, however, showed that some melt will always enter between joint faces and will solidify there. The resulting uncontrolled heat insulation impedes the heat transfer from the active nozzle component to the injection points even though the radial tips be heat conductive and, therefore, the quality of the articles produced tends to vary greatly.

OBJECTS OF THE INVENTION

The invention aims at generally improving over the prior art hot runner nozzles in respect of their thermodynamic performance in order to overcome the drawbacks mentioned.

It is an object of the invention to create a hot runner nozzle design of simple and rugged structure permitting optimum heat transfer to the injection points of the articles to be molded.

Another object of the invention consists in providing a hot runner nozzle adapted to be manufactured economically, to be mounted rapidly and to mass-produce perfect articles of plastic materials in a cost-saving operation.

It is yet another object of the invention to create a hot runner nozzle design that is suitable for producing high-quality articles of plastic materials even with tools into which insertion of conventional nozzles is not easy or not possible at all.

SUMMARY OF THE INVENTION

For use with an injection molding device having a casing, a mold cavity plate and a mold insert, a hot runner nozzle is provided with electrical terminals, with a broad flanged body, with a narrower shaft retained in the casing so as to extend into the mold insert and with at least one nozzle tip outwardly directed at an angle to the axis of an externally heated flow tube that extends through the flanged body and the shaft. In the improvement according to one embodiment of the invention, the shaft comprises a high-strength end portion into which the nozzle tip is heat-conductively inserted and which end portion is continued by a thermally separating body joined, in turn, by a high-strength component of large heat conduction. There is thus a thermal gradation in that the shaft is engaged to the rather cold molding tool and centers the nozzle body therein while thermal separation is provided towards the hot nozzle tips. The separating body arranged between highly heat-conductive component parts restricts heat dissipation at the transition points to a minimum so that the nozzle tips remain hot and very little energy is lost to the casing.

ADVANTAGES OF THE INVENTION

Advantageously, the heat produced at the lower end of the flow tube is concentrated by specially designed heating means which may be, for example, a slotted heating tube or a non-uniform heating coil tightly enclosing the flow tube. The lower end of the heating means is connected to a heat-conducting component such as a metal bush form-fitted to both the flow tube end and to a foot portion of the shaft which comprises an envelope tube as well as a separating sleeve. A thermally resistive or insulating ring support made of ceramics, titanium, nickel chromium steel or some other heat-transfer impeding material may be arranged between neighboring faces of the metal bush and of the separating sleeve, and conical air gaps are expediently provided in the upper regions of these latter components. Consequently, the hot melt will reliably reach the injection points. In addition, the sturdy design thus provided warrants economical operation under the actual stresses of elevated temperatures and high pressure ranging from 300 bars to 2 kbars (which roughly equals 2 to 13 ton/in$^2$).

In a preferred embodiment, the shaft foot retains and centers the nozzle tips, e.g. by means of a shoulder or step at the outside of its separating sleeve, without their reaching the molding tool. The nozzle tips are advantageously seated within a divided mold insert and can be fixed to the shaft foot at an angle between 0° and 90° relative to the axis of the flow tube. In an alternative embodiment, the flow tube may comprise sealing lips that slidably engage, under operational pressure, a supporting collar of the shaft foot through which a nozzle tip extends in axial direction.

Further features, particulars and advantages of the invention will be apparent from the wording of the claims and from the following disclosure of preferred embodiments shown in the

BRIEF DESCRIPTION OF THE DRAWINGS

The invention can be readily understood from the drawings wherein

FIG. 4b is a partly sectional bottom view corresponding to the mounting of FIG. 4a.

DESCRIPTION OF PREFERRED EMBODIMENTS

Figure 1:
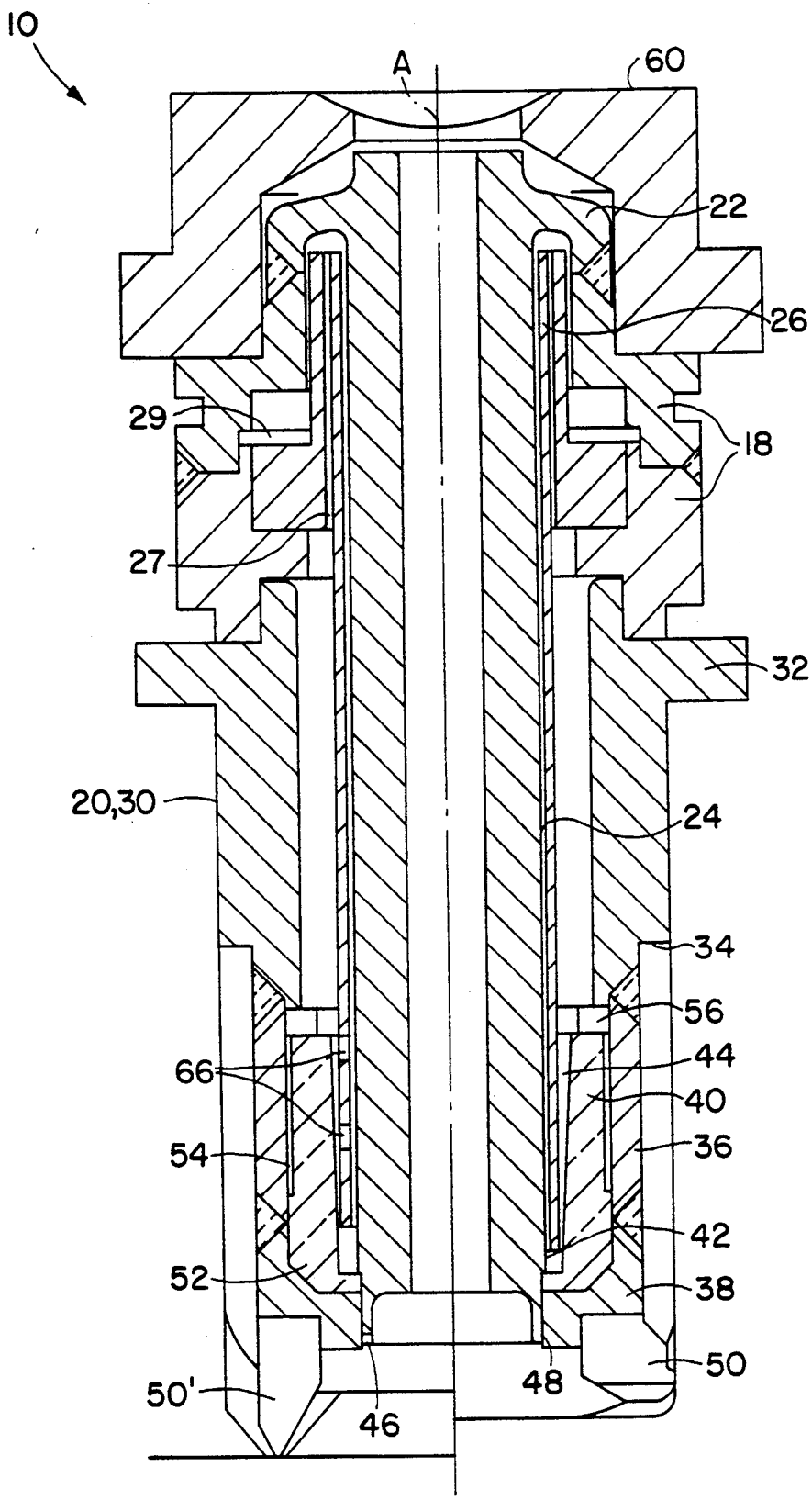
FIG. 1 is a longitudinal section through a hot runner nozzle.

A hot runner nozzle generally designated by 10 is employed in a casing 12 (FIG. 3) having a mold cavity plate 14 and a divided mold insert 16. The nozzle 10 includes a broad flanged body 18 continued by a slender shaft 20. A flow tube 22 heated from its outside extends concentrically through the flanged body 18 and the shaft 20. A thin electrical insulation layer 24 separates the flow tube 22 from heating means which may be a partly slotted heating tube 26 (FIG. 1). Further insulating means 27, 29 designed as bushes and/or disks are arranged around or at a lateral electrode terminal 28 serving to supply power to the heating means.

Figure 3:
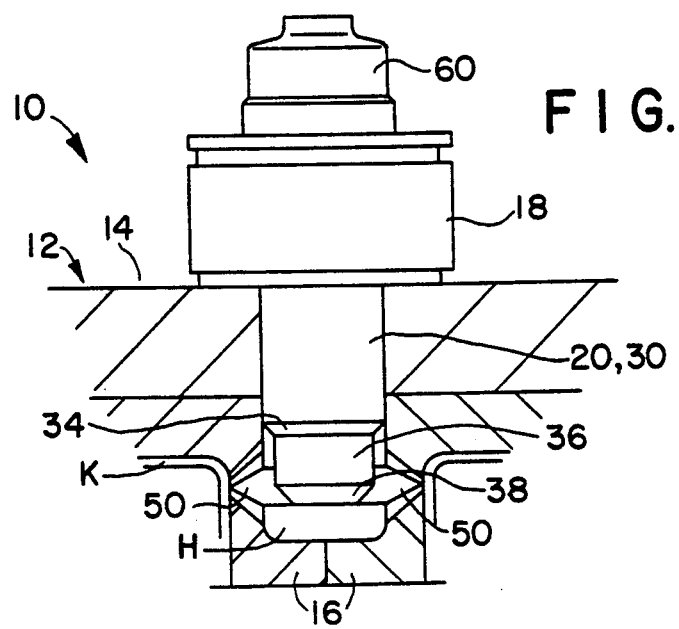
FIG. 3 shows a partly sectional view of a mounted unit.
Figure 4A:
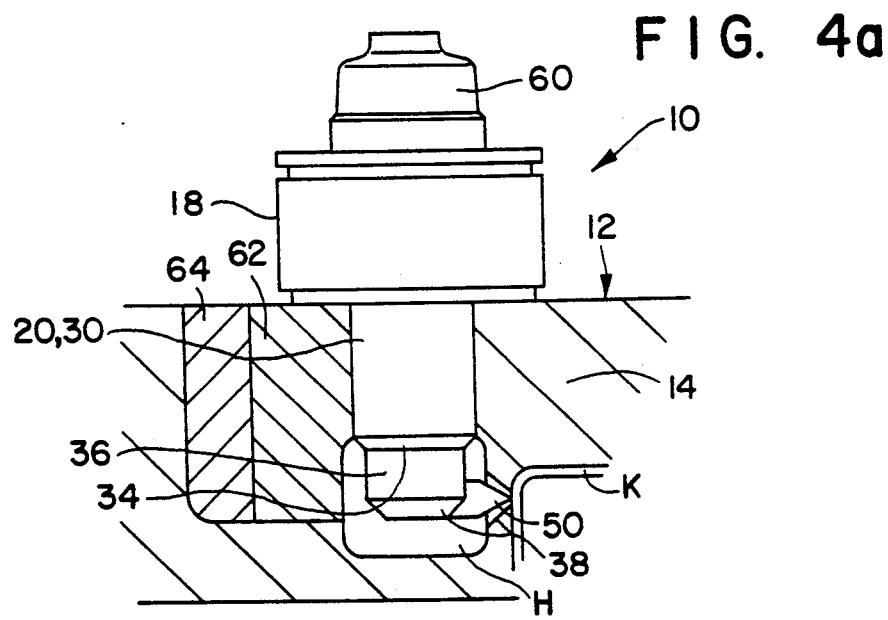
FIG. 4a shows another nozzle mounting similar to FIG. 3.

The shaft 20 is thermally graded. It comprises an outer envelope tube 30 the upper portion of which includes a flange 32 engaging the mold cavity plate 14, and further comprises in a lower portion an inward step or shoulder 34 as an outer transition to a bottom portion of smaller diameter. It will be seen that in FIG. 1, the step 34 is of rectangular cross section whereas the envelope tube 30 of FIGS. 3 and 4a shows a slanted shoulder 34.

The envelope tube 30 is made of high-strength material such as tool steel of large heat conductivity. At its bottom, the envelope tube 30 is welded to a separating sleeve 36 preferably made of a heat-transfer impeding material such as titanium, nickel chromium steel, ceramics or the like, and to sleeve 36 is welded an again highly heat-conductive, preferably ring-shaped foot portion 38.

A heat-conducting bush 40 is inserted inwardly of the sleeve 36. Its lower portion 52 is connected by a welding point 42 to the lower ends of flow tube 22 and heating tube 26. A concical gap 44 separates the heat-conducting bush 40 from the lower region of heating tube 26 having slots 66 there for increased electrical resistance so that the calorific output at the flow tube end is raised. An outer ring gap 54 isolates the heat-conducting bush 40 from the main portion of the separating sleeve 36. A supporting ring 56 seated between adjacent faces of the bush 40 and the envelope tube 30 provides mechanical stability but restricts heat transfer there due to low heat conductivity. The ring 56 is preferably made of a material such as titanium, nickel chromium steel, ceramics, etc.

Figure 4B:
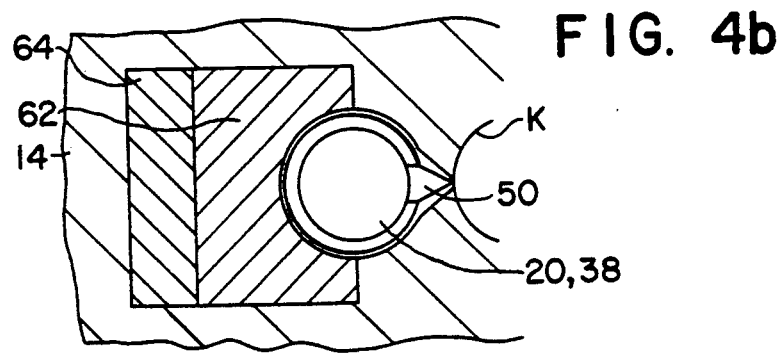

Nozzle tips 50, 50' are heat-conductingly attached, in particular welded, to the foot portion 38 which is preferably made of tool steel. The nozzle tips 50 (righthand in FIG. 1; FIGS. 3, 4a, 4b) extend at substantially a right angle to the axis A of flow tube 22 which passes through the entire hot runner nozzle 10 and is capped on top by a retainer 60. In contrast, the nozzle tip 50' (lefthand in FIG. 1) is vertically oriented, i.e. parallel to the longitudinal axis A.

Figure 2:
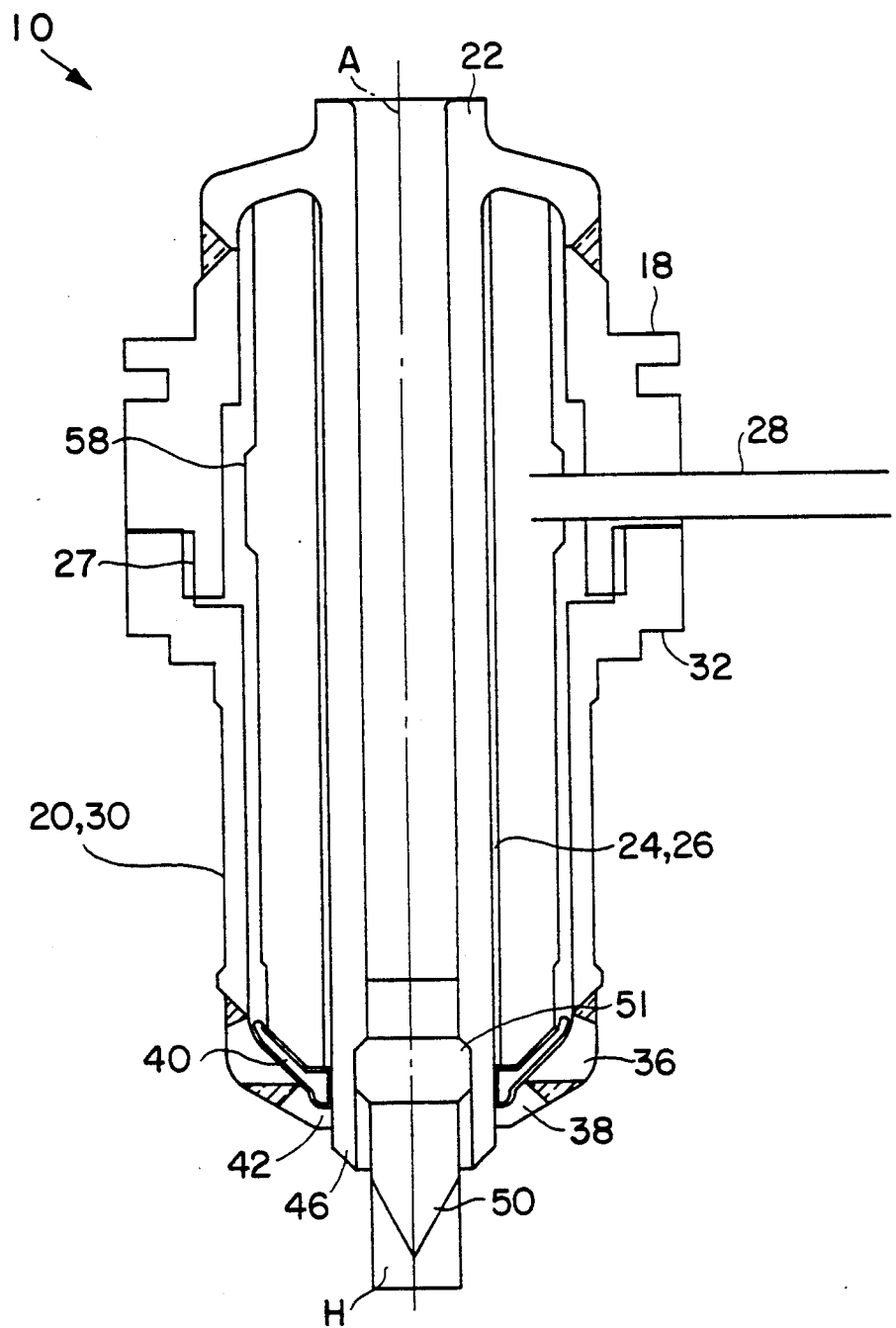
FIG. 2 is a schematic sectional view of another nozzle embodiment.

The embodiment of FIG. 2 is generally of similar structure; therefore, like elements are designated by the same reference symbols as in FIG. 1. Here, too, a cap or retainer (not shown in FIG. 2) may be put on top of the flow tube 22, which contains at its lower end a nozzle tip 50 extending in the direction of axis A into a cavity H of a mold insert (not shown).

At a level which is approximately opposite welding point 42, the nozzle tip 50 includes an enlargement 51 form-fitted into the lower end of flow tube 22. The latter may be integral with sealing lips 46 that enclose the body of nozzle tip 50 in its upper retaining region. In its lower main portion, however, the nozzle tip 50 does not contact the sealing lips 46 which continue the flow tube 22. Rather, the sealing lips 46 extend through the lower end of the heat-conducting bush 40 as well as the shaft foot portion 38, slidably engaging a supporting collar 48 thereof. Consequently, sliding or shifting movements between the interengaging elements 38, 40 (or 42, respectively) and 46 will not be impeded when there is thermal expansion or shrinking due to a change or disturbance of the thermal equilibrium.

Again, thermal insulation towards the casing 12 (not shown in FIG. 2) is provided by the separating sleeve 36 between heat-conductive shaft portions, i.e. between foot portion 38 and envelope tube 30. Owing to this very simple and economical feature, an exceedingly favorable energy performance is obtained. In operation, the melt flows through tube 22 and the high pressure of, say, 1,000 bars (or about 6.5 tons/in$^2$) forces the sealing lips 46 onto the collar 48. However, expansion and contraction movements in an axial direction will not be suppressed.

Examples of mounting will be evident from FIGS. 3, 4a, 4b where shaft 20 and envelope tube 30 are fitted into the mold cavity plate 14 of casing 12. As shown in FIG. 3, the envelope tube 30 extends into the mold insert 16 with its full outer diameter but then continues with the re-entrant step or shoulder 34 so that the slender separating sleeve 36 is free within a cavity H. Step 34 and/or foot 38 serve to center the shaft 20 and thus the hot runner nozzle 10, whereby the exact shape and dimension of the article K to be produced are warranted. A plurality of nozzle tips 50, 50' makes it possible to either gate one article K from various points or to effect simultaneous injection for the production of a number of separate articles.

The embodiment shown in FIGS. 4a, 4b has one nozzle tip 50 only, and shaft 20 with its envelope tube 30 is fixed by a framing mounting piece 62 which, in turn, is positioned in the mold cavity plate 14 by a wedge 64. Further embodiments (not shown) provide outwardly slanted arrangements of the nozzle tips 50 so that they are, relative to the axis A, at any angle between 0° and 90° as determined by the shapes of the tip seats in the foot portion 38.

The heating means can be supplied with low voltage or with mains voltage. In the latter case, the return current is passed through the heating means interior whereas for low voltage operation, it flows directly to the molding tool (casing 12) via flow tube 22 and flanged body 18.

The embodiments of FIGS. 1, 3, 4a, 4b have another thermodynamic advantage. By heating the flow tube 22 to operational temperatures, it will expand longitudinally. Shaft 20, however, inclusive of its components 30, 36, 38 will sustain a much lower temperature level owing to good heat insulation so that despite the supply of heat, an expansion of the nozzle tips 50, 50' will largely be prevented. This is of particular importance for injection points having small diameters since it will not be necessary to adapt the tip length or extension for accurate positioning of the respective nozzle tips.

Where gating to an article is effected laterally through a wall in the tool, it happens conventionally that some residual cold plastics material is also injected into the plastic article so that the product will be faulty in this respect. To forestall this, the invention provides the transfer of heat right onto the surface of the article to be demolded. For this purpose, the tips 50, 50' of the hot runner nozzle 10 are exactly adjusted to the correct position or level in the tool. In accordance with the invention, then, the nozzle tips 50, 50' will not contact the tool at any point; rather, heat can leak to the tool wall via only the cavity H filled with the thermoplastic melt. The metallic conduction along the envelope tube 30 of shaft 20 will be counteracted by the insulating means, viz. the gaps 44 and 54 as well as the supporting ring 56 and the separating sleeve 36. Contrary to the conventional practice, the outflowing melt will not reach the shaft end portion via bores, channels or the like.

The invention is not limited to the embodiments explained but it will be understood that in a preferred embodiment, a hot runner nozzle 10 with lateral electrode terminals 28 has a broad flanged body 18 that continues as a thermally graded narrower shaft 20 through which a heatable flow tube 22 extends. Into its high-strength foot portion 38, at least one nozzle tip 50, 50' is insertable; a high-strength heat-conductive envelope tube 30 having a re-entrant outer shoulder 34 adjacent the casing 12 is joined to a separating sleeve 36 of the shaft 20. The lower end of a heating tube 26 is thermoconductively connected to a metal bush 40 whose upper portion is thermally insulated by air gaps 54, 44 from both the separating sleeve 36 and the heating tube 26. A supporting ring 56 of low heat conduction is mounted between axial faces of the heat-conducting bush 40 and the separating sleeve 36. The nozzle tips 50, 50' are form-fitted or welded to the foot portion 38 at an angle between 0° and 90° relative to the axis A of the shaft 20. The foot portion 38 is centered in a divided mold insert 16 wedge-fitted into the casing 12. The flow tube 22 may be continued by sealing lips 46 that slidably engage a supporting collar 48 of the foot portion 38.

While preferred embodiments have been illustrated and explained hereinabove, it is maintained that many variations and modifications will be apparent to one skilled in the art without departing from the principles of the invention which, therefore, is not to be construed as being restricted to the specific forms described.

I claim:

1. A hot runner nozzle for use in an injection molding machine, said machine having a casing comprised of a mold cavity plate and a mold insert, said nozzle comprising a flow tube, a broad flange body connected to and surrounding an upper portion of said flow tube, said broad flange body provided with electrode terminals, a slender shaft connected to said broad flange body and surrounding a middle portion of said flow tube, a thermally separating body connected to said slender shaft, a high-strength foot portion connected to said thermally separating body, at least one nozzle tip heat-conductingly attached to said foot portion and directed outwardly at an angle to the axis of said flow tube, said thermally separating body and said high-strength foot portion surrounding a lower portion of said flow tube and heating means enclosing said flow tube for heating said runner nozzle.

2. A hot runner nozzle assembly comprising in combination
   (a) a flange body (18),
   (b) a slender shaft (20, 30) extending downwardly from said flange body (18),
   (c) a flow tube (22) for plastic which extends centrally through both said flange body (18) and said slender shaft (20, 30),
   (d) heating means (26) surrounding said flow tube (22) for heating said flow tube (22),
   (e) a high strength foot portion (38) mounted adjacent the low end of said flow tube (22) and joined to the lower end of said slender shaft (20, 30) by a thermally separating body (36),
   (f) a high strength heat conducting member (40) joined to said foot portion (38) and being in heat conducting relationship with said heating means (26), and
   (g) at least one nozzle tip (50, 50')mounted in said foot portion (38).

3. A hot runner nozzle according to claim 2, wherein said heat-conducting member (40) is a metallic bush having a lower portion (52) that is joined to the lower ends of said flow tube (22), said heating means (26) and said foot portion (38).

4. A hot runner nozzle according to claim 2 wherein thermal insulation (54, 44) is provided between (i) the upper portion of said heat-conducting member (40) and (ii) said thermally separating body (36) as well as between the heat-conducting member and said heating means (26).

5. A hot runner nozzle according to claim 4 wherein air gaps form said thermal insulation (54, 44).

6. A hot runner nozzle according to claim 2, wherein there is a conical gap (44) which widens upwardly from the lower portion (52) of said heat-conducting member (40).

7. A hot runner nozzle according to claim 2, wherein at least one supporting ring (56) is seated between adjacent faces of the upper portion of said heat-conducting member (40) and said thermally separating body (36).

8. A hot runner nozzle according to claim 2, wherein each nozzle tip (50, 50') is adapted to be attached to said shaft foot portion (38) at an angle between 0° and 90° relative to the axis (A) of the flow tube (22).

9. A hot runner nozzle according to claim 2 wherein said flow tube (22) includes at its lower end sealing lips (46) slidably engaging a supporting collar (48) located on said shaft foot portion (38).

* * * * *